(12) United States Patent
Otsuka et al.

(10) Patent No.: US 6,784,128 B2
(45) Date of Patent: Aug. 31, 2004

(54) OPTICAL GLASS FOR MOLDING

(75) Inventors: Masaaki Otsuka, Saitama-ken (JP); Yoshinori Yamamoto, Saitama-ken (JP); Koichi Tsuchiya, Saitama-ken (JP); Naruhito Sawanobori, Saitama-ken (JP); Shinobu Nagahama, Saitama-ken (JP)

(73) Assignee: Sumita Optical Glass, Inc., Saitama-ken (JP)

( * ) Notice: Subject to any disclaimer, the term of this patent is extended or adjusted under 35 U.S.C. 154(b) by 0 days.

(21) Appl. No.: 10/193,282

(22) Filed: Jul. 12, 2002

(65) Prior Publication Data

US 2003/0153450 A1 Aug. 14, 2003

(30) Foreign Application Priority Data

Jul. 13, 2001 (JP) .................................... 2001-213295

(51) Int. Cl.[7] .................................................. C03C 3/17
(52) U.S. Cl. ........................................... 501/48; 501/45
(58) Field of Search .............................. 501/45, 46, 48

(56) References Cited

U.S. PATENT DOCUMENTS

| | | | |
|---|---|---|---|
| 2,381,925 A | | 8/1945 | Pineus |
| 4,110,245 A | * | 8/1978 | Yamashita .................... 501/87 |
| 4,261,751 A | * | 4/1981 | Nakamura et al. ............ 501/42 |
| 4,455,384 A | * | 6/1984 | Day et al. ..................... 501/15 |
| 5,711,779 A | * | 1/1998 | Havewala et al. ......... 65/134.1 |
| 5,824,615 A | | 10/1998 | Chang |
| 6,127,297 A | * | 10/2000 | Hashimoto ................... 501/46 |

FOREIGN PATENT DOCUMENTS

| | | |
|---|---|---|
| EP | 0 481 166 | 4/1992 |
| JP | 57-27941 | 2/1982 |
| JP | 60-171244 | 9/1985 |
| JP | 61-36136 | 2/1986 |
| JP | 62100451 A * | 5/1987 ............ C03C/3/16 |
| JP | 02-116642 | 5/1990 |
| JP | 02-124743 | 5/1990 |
| JP | 2-124743 | 5/1990 |
| JP | 03-40934 | 2/1991 |
| JP | 05-132339 | 5/1993 |
| JP | 07-25567 | 3/1995 |
| JP | 8-183632 | 7/1996 |
| JP | 08-183632 | 7/1996 |
| JP | 9-278479 | 10/1997 |
| JP | 09-278479 | 10/1997 |
| JP | 09-301735 | 11/1997 |
| JP | 11-139845 | 5/1999 |

OTHER PUBLICATIONS

English translation of JP 62–100451, Reference No. PTO: 2004–0788.*
Derwent Abstract 1987–167507, Abstract of JP 62–100451.*

* cited by examiner

Primary Examiner—Karl Group
Assistant Examiner—Elizabeth A. Bolden
(74) Attorney, Agent, or Firm—McDermott Will & Emery LLP

(57) ABSTRACT

The present invention provides an optical glass for press molding, in particular, a low softening point glass which contains, in an oxide glass of phosphate type, a durability improving component in addition to glass forming components, and has a weight loss of at most 0.15 weight % in a durability test, and which is represented, in term of elements for making up the glass, by the following chemical composition (mol %):

| | |
|---|---|
| $P_2O_5$ | 32 to 40% |
| $Li_2O$ | 6 to 21% |
| $Na_2O$ | 8 to 31% |
| $K_2O$ | 4 to 22% |
| $Al_2O_3$ | 7.4 to 16% |
| ZnO | 0 to 19.6% |
| BaO | 0 to 12% and |
| Sum of $Li_2O + Na_2O + K_2O$ | 35.1 to 49%. |

7 Claims, No Drawings

OPTICAL GLASS FOR MOLDING

BACKGROUND OF THE INVENTION

1. Field of the Invention

This invention relates to an optical glass for molding, in particular, an optical glass for a precision molding lens capable of carrying out molding at most 400° C.

2. Description of the Prior Art

Of late, aspherical lenses or micro optical lenses used in the optical lens system have often been produced by a molding technique using a high precision metallic mold without polishing. However, the quality of a metallic mold suitable for molding is subject to various limitations from the respect of workability, durability and mass production property. This teaches that the property of a glass to be molded is also limited. The most important property limited is a softening temperature. Molding of a glass having a softening temperature of 600 to 700° C. or higher, for example, has a large influence upon the life of a metallic mold and thus results in lowering of the mass production property of lenses. Accordingly, it has been considered difficult from the standpoint of mass productivity to press-mold commercially available optical glasses of all kinds having been marketed and consequently, it becomes a subject of research to develop a glass excellent in press molding property.

IN JP-A-02-124743, for example, there is disclosed a low softening point, medium refractive index and low dispersion optical glass for precision molding lens, having a yielding temperature (At) of at most 500° C., refractive index (nd) of 1.53 to 1.62 and Abbe number (v d) of 59.0 to 64.0, and comprising $P_2O_5$ and ZnO, as an essential element, and 28 to 49 weight % of ZnO+BaO+SrO+CaO+MgO. This optical glass has such a feature that grinding or polishing after molding is not required because of having a low yielding temperature (At) and excellent stability chemical durability, weather proof property as well as softening property.

JP-A-08-183632 and JP-A-11-139845 have made similar proposals, with which lowering of the softening temperature of the glass is a common subject.

Many of these glasses, however, have softening temperatures of about 400–500° C., since if lower than this temperature range, there arises a problem that chemical durability is lowered and no practical glass is obtained. When the composition of such a glass is so selected as to correspond to the optical properties of commercially available optical glasses, a sufficient softening temperature cannot be obtained sometimes. Further, a glass described in JP-A-57-027941 is known as a low softening point glass (having a low glass transition temperature). This fluorophosphate glass is a glass having a glass transition temperature of about 100° C., i.e. very low softening point glass, but meets with low productivity because of containing a large amount of fluorides resulting in vaporization of low boiling point fluorides during glass melting. Thus, this glass is not considered suitable for mass production.

Phosphate glasses having relatively a lower softening temperature of oxide glasses have hitherto been proposed as a low softening point glass, for example, as shown in JP-A-60-171244, JP-A-61-036136, JP-A-02-116642, JP-A-02-124743, JP-A-03-040934, JP-A-05-132339, JP-A-08-183632, JP-A-09-278479, JP-A-09-301735, etc.

The inventors have made efforts to develop a glass capable of being subjected to press molding at a low temperature, i.e. at most 400° C., in particular, about 380° C. in the above described oxide glass compositions of phosphate type. In view of the technical commonsense of the prior art, it is considered to increase the alkali component so as to lower the glass softening temperature, but if the alkali component is merely increased, the stability, chemical durability, weather resistance and softening property of the glass cannot be satisfied.

It is found as a result of our studies that in the above described glass compositions of phosphate type, the above described problem can be solved by incorporating a considerable amount of $Al_2O_3$ in an increased amount of $Li_2O$, $Na_2O$ and $K_2O$ as an essential element and the present invention is based on this finding.

SUMMARY OF THE INVENTION

It is an object of the present invention to provide an optical glass for molding, being excellent in workability and capable of carrying out a precision molding at a low temperature, e.g. at most 400° C.

It is another object of the present invention to provide, with an excellent producibility, having optical properties, i.e. refractive index (nd) of 1.50 to 1.55 and Abbe number (v d) of 58 to 67.

DETAILED DESCRIPTION OF THE INVENTION

That is, according to the present invention, there is provided an optical glass for precision moldings, which is represented, in term of elements for making up the glass, by the following chemical composition (mol %):

|     |                            |              | Preferred Range |
| --- | -------------------------- | ------------ | --------------- |
| (1) | $P_2O_5$                   | 32 to 40%    | 32 to 37%       |
|     | $Li_2O$                    | 6 to 21%     | 6 to 19.5%      |
|     | $Na_2O$                    | 8 to 31%     | 12 to 22%       |
|     | $K_2O$                     | 4 to 22%     | 7 to 19%        |
|     | $Al_2O_3$                  | 7.4 to 16%   | 8 to 15%        |
|     | ZnO                        | 0 to 19.6%   | 1 to 11%        |
|     | BaO                        | 0 to 12%     | 0.5 to 9% and   |
|     | Sum of $Li_2O + Na_2O + K_2O$ | 35.1 to 49% | 36 to 47.5%  |
| (2) | $P_2O_5$                   | 32 to 37%    | 32 to 36%       |
|     | $Li_2O$                    | 6 to 19.5%   | 7 to 14%        |
|     | $Na_2O$                    | 12 to 22%    | 12 to 19%       |
|     | $K_2O$                     | 7 to 19%     | 7 to 14%        |
|     | $Al_2O_3$                  | 8 to 15%     | 9 to 14%        |
|     | ZnO                        | 1 to 11%     | 4 to 11%        |
|     | BaO                        | 0.5 to 9%    | 2 to 9% and     |
|     | Sum of $Li_2O + Na_2O + K_2O$ | 36 to 47.5% | 36 to 43.5% |

(3) An optical glass for molding, as described in above (1) or (2), wherein the following components are further added (mol %):

| MgO        | 0 to 2%                  |
| ---------- | ------------------------ |
| CaO        | 0 to 6%                  |
| SrO        | 0 to 2%                  |
| $Ln_2O_3$  | 0 to 2% (Ln = La, Gd, Y) |
| $In_2O_3$  | 0 to 2%                  |
| $ZrO_2$    | 0 to 4%                  |
| $WO_3$     | 0 to 2%                  |
| $Nb_2O_5$  | 0 to 2% and              |
| $TiO_2$    | 0 to 1.5%                |

The low softening point glass according to the present invention is a glass of phosphate type which can mainly be used for optical uses and predominantly comprises $P_2O_5$, $Al_2O_3$, ZnO, BaO and $R_2O$ (R: alkali metal), and in particular, at least 7.4% of $Al_2O_3$ is incorporated as a durability improving component, with success, whereby to impart an excellent chemical durability and stability which is represented by a weight loss of at most 0.15 weight %, preferably at most 0.05 weight %, in particular, at most 0.03 weight % in a durability test. This glass has a glass transition temperature (Tg) of 300 to 360° C., molding temperature of 350 to 400° C. and optical characteristic values i.e. refractive index (nd) of 1.50 to 1.55 and Abbe number (v d) of 58 to 67.

In a Chemical Durability Test employed herein, a glass sample (1.5×1.5×1.0 cm) is treated in boiled distilled water for 2 hours and during the same time, a weight loss is measured and represented by percent to the initial weight.

The reasons for limiting the composition range (% should be taken as those by mol unless otherwise indicated) of each component of this low softening point, optical glass according to the present invention to the above described (1) are as follows:

$P_2O_5$ is a glass forming component for the low softening point optical glass according to the present invention, which is present in a proportion of 32 to 40%, since if less than 32%, glass formation is difficult, while if more than 40%, the durability is lowered. The preferred range is 32 to 37%.

$Li_2O$ is a component for improving the softening property of the glass and for lowering the softening temperature of the glass. If the proportion thereof is less than 6%, the above described effect is not sufficient, while if more than 21%, the durability and stability are deteriorated. $Na_2O$ is a component for improving the softening property of the glass and for lowering the softening temperature, similar to $Li_2O$. If the proportion thereof is less than 8%, the above described effect is not sufficient, while if more than 31%, the durability is lowered to deteriorate stability. $K_2O$ is a component for improving the softening property of the glass and for lowering the softening temperature of the glass, not so as $Li_2O$ and $Na_2O$. If the proportion thereof is less than 4%, the above described effect is not sufficient, while if more than 22%, the durability is lowered to render the glass unstable.

The preferred ranges of $Li_2O$, $Na_2O$ and $K_2O$ are respectively 6 to 19.5%, 12 to 22% and 7 to 19%.

Furthermore, $R_2O$ ($Li_2O+Na_2O+K_2O$) represents a sum of alkali metal oxide components and is generally adjusted to 35.1 to 49%. If the proportion is less than 35.1%, it is not sufficient to lower the softening point of the optical glass for molding according to the present invention, while if more than 49%, not only the durability is markedly lowered, but also the glass is unstable. The preferred range is 36 to 47.5%.

$Al_2O_3$ has an effect of improving the durability as the characteristic component of the glass according to the present invention but the solubility is so deteriorated thereby that the upper limit should be 16%. Further, if the proportion is less than 7.4%, the durability is markedly lowered. Thus, the proportion of $Al_2O_3$ is generally in a range of 7.4 to 16%. The preferred range is 8 to 15%.

ZnO is a component for assisting lowering the softening point, but if exceeding 19.6%, the glass is unstable. The preferred range is 1 to 11%.

BaO is a component for improving the melting property and stability of the glass, but if exceeding 12%, the durability is lowered. The preferred range is 0.5 to 9%.

In the optical glass of the foregoing (2) according to the present invention, the ground for limiting $P_2O_5$, $Li_2O$, $Na_2O$, $K_2O$, $R_2O$ and $Al_2O_3$ can be illustrated in a substantially similar manner to the foregoing (1), but ZnO and BaO are essential components and if the proportion of ZnO is less than 1%, the stability of the glass gets worse and the effect of lowering the softening point is not sufficiently obtained, while if exceeding 11%, there arises a problem that the stability of the glass is lowered. The preferred range is 4 to 11%.

BaO is a component for improving the stability and durability, since if the proportion is less than 0.5%, the effect of stability is not sufficient and if exceeding 9%, the durability is remarkably lowered. The preferred range is 2 to 9%.

The grounds for limiting the optional components in the foregoing (3) are as follows:

RO (oxides of alkaline earth metals slected from Mg, Ca and Sr) is a component for improving the melting property of the glass, but if exceeding the upper limit, the glass is unstable.

$In_2O_3$ is a component for improving the durability, but if its proportion exceeds 2%, the melting property is deteriorated to retain a residue.

$ZrO_2$ is a component for remarkably improving the stability and durability, but if its proportion exceeds 4%, the melting property is deteriorated to retain a residue. The preferred range is 0 to 3.5%.

$WO_3$ is a component for improving the weather resistance, but if the reducing atmosphere is strengthened the glass tends to be colored, accordingly, the upper limit should be 2%.

$Nb_2O_5$ is a component for improving the stability and durability, but its upper limit should be 2%, in order to raise the glass transition temperature.

$TiO_2$ is a component for improving the durability, but since it tends to be colored and crystallized, its upper limit should be 1.5%.

$Ln_2O_3$ (Ln: La, Y, Gd) is added in a proportion of 0 to 2% so as to improve mainly the weather resistance. If exceeding the upper limit, there arises a problem that the melting property gets worse to retain a melting residue.

As illustrated above, the inventors have tried to develop a glass of oxide type, which can be subjected to press molding at a temperature of at most 400° C. and have reached an epoch making glass composition. Such a glass has markedly improved mass productivity and workability in a siding board heating molding (mold pressing) and moreover, gives an improved producibility in a softening production step because of being an oxide type glass. According to the present invention, it is found that press molding a micro optical element having been considered difficult can be carried out with high producibility.

Production of the low softening point optical glass according to the present invention is carried out by a conventional glass production process, using as a raw material, ordinary glass raw materials such as phosphorus pentaoxide, salts such as metaphosphates, sodium carbonate, potassium carbonate, etc. A transparent glass can be prepared by adequately melting these raw materials in a platinum crucible at a temperature of about 1000 to 1300° C. and then casting the resulting melt in a mold made of carbon, etc. Then, the resulting glass is subjected to annealing at about glass transition temperature, thus obtaining a thermally stable glass. This process can also be applied to production of a preform of drop of melten glass, which will be used for the production of a lens for molding.

In these glasses, the glass transition temperature is low, for example, about 300 to 350° C. and molding temperature is carried out at about 350 to 400° C. The chemical durability thereof can be represented by a weight loss with a boiling treatment in distilled water in a range of at most 0.15%, which does not constitute any problem on practical use.

A small amount of a defoaming agent such as $Sb_2O_3$, etc. can further be added.

The following examples are given in order to illustrate the present invention in detail without limiting the same.

EXAMPLES 1 TO 43

Using the corresponding metaphosphates, oxides, carbonates, nitrates, etc., as a raw material of each component, the component compositions (100 g) shown in Tables 2, 5, 8, 11 and 14 were respectively weighed so as to give compositions as shown in Tables 1, 4, 7, 10 and 13 after vitrification, adequately mixed, then charged in a platinum crucible, molten for several hours in an electric furnace at a temperature of 1000 to 1300° C., homogenized and refined by stirring and then poured into a metallic mold, followed by gradually cooling, to obtain a clear and homogeneous glass.

In Tables 3, 6, 9, 12 and 15 are shown the thermal properties (transition temperature (Tg), yielding temperature (At), thermal expansion coefficient at 50–250° C.), optical properties (refractive index (nd), Abbe number (ν d)) and data of the Chemical Durability Test of the resulting glasses.

In the Chemical Durability Test employed herein, a glass sample (1.5×1.5×1.0 cm) is treated in boiled distilled water for 2 hours, during which a weight loss is measured and represented by percent to the initial weight.

Thermal properties (transition temperature (Tg), yielding temperature (At), thermal expansion coefficient at 50–250° C.) were measured by the use of a thermomechanical analyzer (TMA) in the case of raising the temperature at 5° C. per minute.

COMPARATIVE EXAMPLE 1

As Comparative Example, compositions were optionally chosen in the scope as claimed in JP-B-07-025567.

Using the corresponding metaphosphates, oxides, carbonates, nitrates, etc., as a raw material of each component, these materials were weighed to give 100 g of the component compositions as shown in Table 14, Comparative Example 1, after vitrification, adequately mixed, charged in a platinum crucible, molten for several hours in an electric furnace at a temperature of 1000 to 1300° C., homogenized and refined by stirring and then poured into a metallic mold to obtain a clear and homogeneous glass.

In the similar manner to Examples, in Table 15 are shown the thermal properties (transition temperature (Tg), yielding temperature (At), thermal expansion coefficient at 50–250° C.), optical properties (refractive index (nd), Abbe number (ν d)) and data of the Chemical Durability Test of the resulting glasses.

TABLE 1

| mol % | 1 | 2 | 3 | 4 | 5 | 6 | 7 | 8 | 9 |
|---|---|---|---|---|---|---|---|---|---|
| $P_2O_5$ | 34.94 | 36.61 | 33.78 | 32.64 | 35 | 34.58 | 35.7 | 33.88 | 32.9 |
| $Li_2O$ | 6.64 | 6.96 | 13.37 | 19.39 | 11.5 | 11.36 | 7.07 | 11.3 | 6.65 |
| $Na_2O$ | 17.61 | 18.45 | 16.12 | 12.46 | 16.6 | 16.4 | 17.03 | 14 | 17.63 |
| $K_2O$ | 11.58 | 12.14 | 10.6 | 10.25 | 10.9 | 10.77 | 11.21 | 10.7 | 11.6 |
| $Al_2O_3$ | 9.73 | 10.2 | 9.8 | 9.47 | 12 | 11.86 | 10.35 | 7.4 | 9.75 |
| ZnO | 19.5 | 10.22 | 9.82 | 9.49 | 12 | 14.39 | 10.38 | 18.9 | 19.53 |
| BaO | | 5.42 | 6.51 | 6.3 | 2 | 0.64 | 8.26 | 3.57 | 1.94 |
| MgO | | | | | | | | | |
| CaO | | | | | | | | | |
| SrO | | | | | | | | | |
| $In_2O_3$ | | | | | | | | | |
| $ZrO_2$ | | | | | | | | | 0.25 |
| $WO_3$ | | | | | | | | | |
| $Nb_2O_5$ | | | | | | | | | |
| $TiO_2$ | | | | | | | | | |
| $La_2O_3$ | | | | | | | | | |
| $Y_2O_3$ | | | | | | | | | |
| $Gd_2O_3$ | | | | | | | | | |
| $R_2O$ | 35.83 | 37.55 | 40.09 | 42.1 | 39 | 38.53 | 35.31 | 36 | 35.88 |
| | 100 | 100 | 100 | 100 | 100 | 100 | 100 | 100 | 100 |

TABLE 2

| wt % | 1 | 2 | 3 | 4 | 5 | 6 | 7 | 8 | 9 |
|---|---|---|---|---|---|---|---|---|---|
| $P_2O_5$ | 50 | 50 | 48 | 48 | 50.31 | 50.31 | 48 | 48.62 | 47 |
| $Li_2O$ | 2 | 2 | 4 | 6 | 3.48 | 3.48 | 2 | 3.41 | 2 |
| $Na_2O$ | 11 | 11 | 10 | 8 | 10.42 | 10.42 | 10 | 8.77 | 11 |
| $K_2O$ | 11 | 11 | 10 | 10 | 10.4 | 10.4 | 10 | 10.19 | 11 |
| $Al_2O_3$ | 10 | 10 | 10 | 10 | 12.39 | 12.39 | 10 | 7.63 | 10 |
| ZnO | 16 | 8 | 8 | 8 | 9.89 | 12 | 8 | 15.55 | 16 |
| BaO | | 8 | 10 | 10 | 3.11 | 1 | 12 | 5.53 | 3 |
| MgO | | | | | | | | | |
| CaO | | | | | | | | | |
| SrO | | | | | | | | | |
| $In_2O_3$ | | | | | | | | | |
| $ZrO_2$ | | | | | | | | | 0.3 |
| $WO_3$ | | | | | | | | | |
| $Nb_2O_5$ | | | | | | | | | |
| $TiO_2$ | | | | | | | | | |
| $La_2O_3$ | | | | | | | | | |
| $Y_2O_3$ | | | | | | | | | |
| $Gd_2O_3$ | | | | | | | | | |
| $R_2O$ | 24 | 24 | 24 | 24 | 24.3 | 24.3 | 22 | 22.37 | 24 |
| | 100 | 100 | 100 | 100 | 100 | 100 | 100 | 100 | 100 |

TABLE 3

| | Example | | | | | | | | |
|---|---|---|---|---|---|---|---|---|---|
| | 1 | 2 | 3 | 4 | 5 | 6 | 7 | 8 | 9 |
| Tg | 344 | 353 | 326 | 329 | 339 | 336 | 351 | 335 | 328 |
| At | 367 | 381 | 354 | 350 | 367 | 363 | 380 | 359 | 355 |
| $\alpha_{50-250} 10^{-7}$ ° C. | 165 | 162 | 164 | 165 | 161 | 162 | 162 | 170 | 168 |
| Weight Loss (%) | 0.018 | 0.013 | 0.008 | 0.007 | 0.006 | 0.006 | 0.012 | 0.024 | 0.008 |
| nd | 1.52829 | 1.5303 | 1.53356 | 1.53616 | 1.527 | 1.52608 | 1.5365 | 1.53985 | 1.52908 |
| vd | 63.4 | 64.7 | 64.1 | 63.9 | 64.4 | 64.3 | 64.3 | 62.6 | 62.2 |

TABLE 4

| | Example | | | | | | | | |
|---|---|---|---|---|---|---|---|---|---|
| mol % | 10 | 11 | 12 | 13 | 14 | 15 | 16 | 17 | 18 |
| $P_2O_5$ | 33.94 | 36.43 | 36 | 36.87 | 36.15 | 36.46 | 33.59 | 40 | 33.8 |
| $Li_2O$ | 13.44 | 13.06 | 13.15 | 13.09 | 13.09 | 13.2 | 12.77 | 10 | 13.37 |
| $Na_2O$ | 21.06 | 20.46 | 20.61 | 20.52 | 20.5 | 20.67 | 15.39 | 20 | 16.12 |
| $K_2O$ | 13.85 | 13.46 | 13.56 | 13.5 | 13.49 | 13.6 | 10.13 | 15 | 10.6 |
| $Al_2O_3$ | 9.85 | 13.4 | 13.49 | 13.43 | 14.38 | 14.5 | 11.23 | 10 | 9.8 |
| ZnO | | 2.4 | | 1.8 | 1.2 | | 10.55 | | 7.8 |
| BaO | 7.86 | | | | 1.24 | 5 | | | 6.51 |
| MgO | | | | | | | | | |
| CaO | | | | | | 5.1 | | | |
| SrO | | | | | | | | | |
| $In_2O_3$ | | | | | | | | | |
| $ZrO_2$ | | 0.79 | 3.19 | 0.79 | 1.19 | 1.2 | | | |
| $WO_3$ | | | | | | | | 0.5 | |
| $Nb_2O_5$ | | | | | 0.37 | | | | |
| $TiO_2$ | | | | | | | | 1.5 | |
| $La_2O_3$ | | | | | | | | | |
| $Y_2O_3$ | | | | | | | | | |
| $Gd_2O_3$ | | | | | | | | | |
| $R_2O$ | 48.35 | 46.98 | 47.32 | 47.11 | 47.08 | 47.47 | 38.29 | 45 | 40.09 |
| | 100 | 100 | 100 | 100 | 100 | 100 | 100 | 100 | 100 |

TABLE 5

| | Example | | | | | | | | |
|---|---|---|---|---|---|---|---|---|---|
| wt % | 10 | 11 | 12 | 13 | 14 | 15 | 16 | 17 | 18 |
| $P_2O_5$ | 48 | 53 | 52 | 53.5 | 52.5 | 52.5 | 50 | 54.51 | 47.67 |
| $Li_2O$ | 4 | 4 | 4 | 4 | 4 | 4 | 4 | 2.87 | 3.97 |
| $Na_2O$ | 13 | 13 | 13 | 13 | 13 | 13 | 10 | 11.9 | 9.93 |
| $K_2O$ | 13 | 13 | 13 | 13 | 13 | 13 | 10 | 13.57 | 9.93 |
| $Al_2O_3$ | 10 | 14 | 14 | 14 | 15 | 15 | 12 | 9.79 | 9.93 |
| ZnO | | 2 | | 1.5 | 1 | | 9 | | 6.31 |
| BaO | 12 | | | | | | 2 | 7.36 | 9.92 |
| MgO | | | | | | | | | |
| CaO | | | | | | | 3 | | |
| SrO | | | | | | | | | |
| $In_2O_3$ | | | | | | | | | |
| $ZrO_2$ | | 1 | 4 | 1 | 1.5 | 1.5 | | | |
| $WO_3$ | | | | | | | | | 1.15 |
| $Nb_2O_5$ | | | | | | 1 | | | |
| $TiO_2$ | | | | | | | | | 1.19 |
| $La_2O_3$ | | | | | | | | | |
| $Y_2O_3$ | | | | | | | | | |
| $Gd_2O_3$ | | | | | | | | | |
| $R_2O$ | 30 | 30 | 30 | 30 | 30 | 30 | 24 | 28.34 | 23.83 |
| | 100 | 100 | 100 | 100 | 100 | 100 | 100 | 100 | 100 |

TABLE 6

| | Example | | | | | | | | |
|---|---|---|---|---|---|---|---|---|---|
| | 10 | 11 | 12 | 13 | 14 | 15 | 16 | 17 | 18 |
| Tg | 309 | 334 | 332 | 324 | 336 | 334 | 331 | 355 | 335 |
| At | 335 | 357 | 366 | 353 | 360 | 364 | 360 | 380 | 362 |
| $\alpha_{50-250}$ $10^{-7}$ ° C. | 204 | 184 | 184 | 191 | 180 | 183 | 159 | 191 | |
| Weight Loss (%) | 0.147 | 0.028 | 0.013 | 0.060 | 0.045 | 0.028 | 0.009 | 0.037 | 0.000 |
| nd | 1.51861 | 1.51353 | 1.5169 | 1.51299 | 1.51295 | 1.51496 | 1.52923 | 1.52089 | 1.54194 |
| vd | 64.7 | 65.4 | 63.3 | 65.6 | 64.9 | 63.1 | 64.1 | 66.9 | 58.5 |

TABLE 7

| mol % | Example | | | | | | | | |
|---|---|---|---|---|---|---|---|---|---|
| | 19 | 20 | 21 | 22 | 23 | 24 | 25 | 26 | 27 |
| $P_2O_5$ | 33.54 | 33.54 | 33.54 | 33.14 | 34.17 | 33.73 | 34.12 | 34.01 | 33.28 |
| $Li_2O$ | 13.26 | 13.26 | 13.26 | 13.39 | 13.53 | 13.35 | 13.51 | 13.46 | 13.18 |
| $Na_2O$ | 15.99 | 15.99 | 15.99 | 16.14 | 16.31 | 16.09 | 16.29 | 16.22 | 15.89 |
| $K_2O$ | 12.62 | 12.62 | 12.62 | 11.68 | 12.88 | 10.59 | 10.72 | 10.68 | 12.54 |
| $Al_2O_3$ | 9.72 | 9.72 | 9.72 | 8.83 | 9.91 | 9.78 | 9.9 | 9.86 | 9.66 |
| ZnO | 7.7 | 7.7 | 7.7 | 9.83 | 4.97 | 9.8 | 9.92 | 9.88 | 9.68 |
| BaO | 5.17 | 5.17 | 5.17 | 4.89 | 6.59 | 5.85 | 4.61 | 4.59 | 2.57 |
| MgO | | | 2 | | | | | | |
| CaO | | 2 | | | | | | | |
| SrO | 2 | | | | 0.97 | | | | |
| $In_2O_3$ | | | | 0.72 | | | | | |
| $ZrO_2$ | | | | 0.41 | 1.64 | 0.81 | | | 3.2 |
| $WO_3$ | | | | | | | 1.3 | | |
| $Nb_2O_5$ | | | | | | | | | |
| $TiO_2$ | | | | | | | | | |
| $La_2O_3$ | | | | | | | | 0.93 | |
| $Y_2O_3$ | | | | | | | | | |
| $Gd_2O_3$ | | | | | | | | | |
| $R_2O$ | 41.87 | 41.87 | 41.87 | 41.21 | 42.72 | 40.03 | 40.52 | 40.36 | 41.61 |
| | 100 | 100 | 100 | 100 | 100 | 100 | 100 | 100 | 100 |

TABLE 8

| wt % | Example | | | | | | | | |
|---|---|---|---|---|---|---|---|---|---|
| | 19 | 20 | 21 | 22 | 23 | 24 | 25 | 26 | 27 |
| $P_2O_5$ | 47.8 | 48.27 | 48.42 | 47 | 48 | 48 | 48 | 48 | 48 |
| $Li_2O$ | 3.98 | 4.02 | 4.03 | 4 | 4 | 4 | 4 | 4 | 4 |
| $Na_2O$ | 9.96 | 10.05 | 10.09 | 10 | 10 | 10 | 10 | 10 | 10 |
| $K_2O$ | 11.95 | 12.07 | 12.1 | 11 | 12 | 10 | 10 | 10 | 12 |
| $Al_2O_3$ | 9.96 | 10.05 | 10.09 | 9 | 10 | 10 | 10 | 10 | 10 |
| ZnO | 6.3 | 6.36 | 6.38 | 8 | 4 | 8 | 8 | 8 | 8 |
| BaO | 7.97 | 8.04 | 8.07 | 7.5 | 10 | 9 | 7 | 7 | 4 |
| MgO | | | 0.82 | | | | | | |
| CaO | | 1.14 | | | | | | | |
| SrO | 2.08 | | | | 1 | | | | |
| $In_2O_3$ | | | | 2 | | | | | |
| $ZrO_2$ | | | | 0.5 | 2 | 1 | | | 4 |
| $WO_3$ | | | | | | | 3 | | |
| $Nb_2O_5$ | | | | | | | | | |
| $TiO_2$ | | | | | | | | | |
| $La_2O_3$ | | | | | | | | 3 | |
| $Y_2O_3$ | | | | | | | | | |
| $Gd_2O_3$ | | | | | | | | | |
| $R_2O$ | 25.89 | 26.14 | 26.22 | 25 | 26 | 24 | 24 | 24 | 26 |
| | 100 | 100 | 100 | 100 | 100 | 100 | 100 | 100 | 100 |

TABLE 9

| | Example | | | | | | | | |
|---|---|---|---|---|---|---|---|---|---|
| | 19 | 20 | 21 | 22 | 23 | 24 | 25 | 26 | 27 |
| Tg | 321 | 318 | 319 | 327 | 325 | 326 | 330 | 330 | 327 |
| At | 352 | 346 | 345 | 350 | 356 | 352 | 356 | 355 | 357 |
| $\alpha_{50-250}$ $10^{-7}$ ° C. | 182 | 184 | 179 | 177 | 183 | 174 | 170 | 170 | 171 |
| Weight Loss (%) | 0.029 | 0.027 | 0.025 | 0.007 | 0.008 | 0.010 | 0.000 | 0.006 | 0.018 |
| nd | 1.52797 | 1.52728 | 1.52631 | 1.53392 | 1.53156 | 1.53523 | 1.53473 | 1.53551 | 1.53368 |
| vd | 64.2 | 64.3 | 64.2 | 62.7 | 63.3 | 63.3 | 64 | 61.8 | 60.9 |

TABLE 10

| mol % | Example | | | | | | | | |
|---|---|---|---|---|---|---|---|---|---|
| | 28 | 29 | 30 | 31 | 32 | 33 | 34 | 35 | 36 |
| $P_2O_5$ | 33.71 | 34.58 | 33.88 | 35.52 | 33.4 | 34.38 | 36.54 | 33.89 | 33.79 |
| $Li_2O$ | 13.35 | 7.19 | 13.41 | 7.03 | 13.22 | 13.61 | 13.36 | 13.42 | 13.37 |
| $Na_2O$ | 16.09 | 17.16 | 16.17 | 16.94 | 15.94 | 16.4 | 16.1 | 16.17 | 16.12 |
| $K_2O$ | 12.7 | 10.85 | 12.76 | 11.15 | 12.58 | 12.95 | 13.77 | 10.64 | 10.61 |
| $Al_2O_3$ | 9.78 | 9.52 | 9.83 | 8.24 | 9.69 | 9.97 | 11.74 | 7.86 | 7.84 |
| ZnO | 9.8 | 15.7 | 9.85 | 12.9 | 9.71 | 6.24 | 7.36 | 9.85 | 9.82 |
| BaO | 3.25 | 5 | 3.27 | 8.22 | 3.86 | 5.3 | | 6.54 | 5.21 |
| MgO | | | | | | | | | |
| CaO | | | | | | | | | |
| SrO | | | | | | | | | |
| $In_2O_3$ | | | | | | | | | |
| $ZrO_2$ | | | | | | | 1.6 | | 1.63 | 3.24 |
| $WO_3$ | | | | | | | | | |
| $Nb_2O_5$ | | | | | | | | 1.15 | 1.13 |
| $TiO_2$ | | | | | | | | | |
| $La_2O_3$ | | | | | | | | | |
| $Y_2O_3$ | 1.32 | | | | | | | | |
| $Gd_2O_3$ | | | 0.83 | | | | | | |
| $R_2O$ | 42.14 | 35.2 | 42.34 | 35.12 | 41.74 | 42.96 | 43.23 | 40.23 | 40.1 |
| | 100 | 100 | 100 | 100 | 100 | 100 | 100 | 100 | 100 |

TABLE 11

| wt % | Example | | | | | | | | |
|---|---|---|---|---|---|---|---|---|---|
| | 28 | 29 | 30 | 31 | 32 | 33 | 34 | 35 | 36 |
| $P_2O_5$ | 48 | 48 | 48 | 48 | 48 | 48 | 52 | 48 | 48 |
| $Li_2O$ | 4 | 2.1 | 4 | 2 | 4 | 4 | 4 | 4 | 4 |
| $Na_2O$ | 10 | 10.4 | 10 | 10 | 10 | 10 | 10 | 10 | 10 |
| $K_2O$ | 12 | 10 | 12 | 10 | 12 | 12 | 13 | 10 | 10 |
| $Al_2O_3$ | 10 | 9.5 | 10 | 8 | 10 | 10 | 12 | 8 | 8 |
| ZnO | 8 | 12.5 | 8 | 10 | 8 | 5 | 6 | 8 | 8 |
| BaO | 5 | 7.5 | 5 | 12 | 6 | 8 | | 10 | 8 |
| MgO | | | | | | | | | |
| CaO | | | | | | | | | |
| SrO | | | | | | | | | |
| $In_2O_3$ | | | | | | | | | |
| $ZrO_2$ | | | | | 2 | | | 2 | 4 |
| $WO_3$ | | | | | | | | | |
| $Nb_2O_5$ | | | | | | | | 3 | 3 |
| $TiO_2$ | | | | | | | | | |
| $La_2O_3$ | | | | | | | | | |
| $Y_2O_3$ | 3 | | | | | | | | |
| $Gd_2O_3$ | | | 3 | | | | | | |
| $R_2O$ | 26 | 22.5 | 26 | 22 | 26 | 26 | 27 | 24 | 24 |
| | 100 | 100 | 100 | 100 | 100 | 100 | 100 | 100 | 100 |

TABLE 12

| | Example | | | | | | | | |
|---|---|---|---|---|---|---|---|---|---|
| | 28 | 29 | 30 | 31 | 32 | 33 | 34 | 35 | 36 |
| Tg | 322 | 342 | 322 | 348 | 322 | 331 | 346 | 327 | 331 |
| At | 352 | 367 | 350 | 374 | 354 | 359 | 372 | 355 | 362 |
| $\alpha_{50-250}$ $10^{-7}$ °C. | 179 | 163 | 181 | 167 | 169 | 175 | 171 | 174 | 166 |
| Weight Loss (%) | 0.020 | 0.015 | 0.013 | 0.023 | 0.017 | 0.034 | 0.016 | 0.005 | 0.012 |
| nd | 1.52853 | 1.53418 | 1.52812 | 1.5391 | 1.5303 | 1.53622 | 1.52845 | 1.53875 | 1.54208 |
| νd | 65.1 | 66 | 64.6 | 66.7 | 65.7 | 60.5 | 61.2 | 62.3 | 60.9 |

TABLE 13

| mol % | Example | | | | | | | Comparative Example 1 |
|---|---|---|---|---|---|---|---|---|
| | 37 | 38 | 39 | 40 | 41 | 42 | 43 | |
| $P_2O_5$ | 33.5 | 33.9 | 34.91 | 37.83 | 34.6 | 32.4 | 34.17 | 36.42 |
| $Li_2O$ | 13.3 | 13.4 | 12.52 | 13.57 | 13.69 | 12.83 | 20.29 | 12.81 |
| $Na_2O$ | 18.5 | 17 | 30.17 | 8.18 | 8.25 | 26.28 | 13.04 | 9.27 |
| $K_2O$ | 7.4 | 8 | 4.96 | 21.52 | 18.46 | 5.09 | 10.73 | 6.1 |
| $Al_2O_3$ | 9.8 | 9.8 | 12.84 | 13.92 | 10.03 | 9.39 | 9.91 | 1.88 |
| ZnO | 9.8 | 9.8 | 4.6 | 4.98 | 8.8 | 8.24 | | 29.4 |
| BaO | 6.5 | 6.5 | | | 5.34 | 5 | 11.86 | 4.12 |
| MgO | | | | | | | | |
| CaO | | | | | | | | |
| SrO | | | | | | | | |
| $In_2O_3$ | | | | | | | | |
| $ZrO_2$ | 1.2 | 1.6 | | | 0.83 | 0.77 | | |
| $WO_3$ | | | | | | | | |
| $Nb_2O_5$ | | | | | | | | |
| $TiO_2$ | | | | | | | | |
| $La_2O_3$ | | | | | | | | |
| $Y_2O_3$ | | | | | | | | |
| $Gd_2O_3$ | | | | | | | | |
| $R_2O$ | 39.2 | 38.4 | 47.65 | 43.27 | 40.4 | 44.2 | 44.06 | 28.18 |
| | 100 | 100 | 100 | 100 | 100 | 100 | 100 | 100 |

TABLE 14

| Wt % | Example | | | | | | | Comparative Example 1 |
|---|---|---|---|---|---|---|---|---|
| | 37 | 38 | 39 | 40 | 41 | 42 | 43 | |
| $P_2O_5$ | 48 | 48 | 53 | 53 | 48 | 48 | 48 | 54 |
| $Li_2O$ | 4 | 4 | 4 | 4 | 4 | 4 | 6 | 4 |
| $Na_2O$ | 11.5 | 10.5 | 20 | 5 | 5 | 17 | 8 | 6 |
| $K_2O$ | 7 | 7.5 | 5 | 20 | 17 | 5 | 10 | 6 |
| $Al_2O_3$ | 10 | 10 | 14 | 14 | 10 | 10 | 10 | 2 |
| ZnO | 8 | 8 | 4 | 4 | 7 | 7 | | 25 |
| BaO | 10 | 10 | | | 8 | 8 | 18 | 3 |
| MgO | | | | | | | | |
| CaO | | | | | | | | |
| SrO | | | | | | | | |
| $In_2O_3$ | | | | | | | | |
| $ZrO_2$ | 1.5 | 2 | | | 1 | 1 | | |
| $WO_3$ | | | | | | | | |
| $Nb_2O_5$ | | | | | | | | |
| $TiO_2$ | | | | | | | | |
| $La_2O_3$ | | | | | | | | |
| $Y_2O_3$ | | | | | | | | |
| $Gd_2O_3$ | | | | | | | | |
| $R_2O$ | 22.5 | 22 | 29 | 29 | 26 | 26 | 24 | 16 |
| | 100 | 100 | 100 | 100 | 100 | 100 | 100 | 100 |

TABLE 15

| | Example | | | | | | | Comparative Example 1 |
|---|---|---|---|---|---|---|---|---|
| | 37 | 38 | 39 | 40 | 41 | 42 | 43 | |
| Tg | 338 | 337 | 329 | 356 | 335 | 315 | 333 | 322 |
| At | 362 | 365 | 359 | 378 | 359 | 341 | 361 | 348 |
| $\alpha_{50-250}$ $10^{-7}$ °C. | 165 | 163 | 186 | 172 | 182 | 183 | 187 | 142 |
| Weight Loss (%) | 0.010 | 0.004 | 0.042 | 0.041 | 0.027 | 0.037 | 0.024 | 0.120 |
| nd | 1.5413 | 1.54239 | 1.51604 | 1.51364 | 1.52838 | 1.53031 | 1.53614 | 1.55014 |
| νd | 62.5 | 62.1 | 64.3 | 66.1 | 63.4 | 62.5 | 65.5 | 63.2 |

ADVANTAGES OF PRESENT INVENTION

The low softening point optical glass with each of the compositions as illustrated above according to the present invention is particularly useful for molding of lenses for molding or micro optical elements with complicated shapes, because of having a relatively low softening temperature. Furthermore, this optical glass is more excellent in utility due to its chemical durability.

What is claimed is:

1. An optical glass having a refractive index (nd) of 1.50 to 1.55, an Abbe number (vd) of 58 to 67, a press molding temperature no greater than 400° C. and a weight loss no greater than 0.15 weight %, which is represented, in term of elements for making up the glass, by the following chemical composition (mol %):

| | |
|---|---|
| $P_2O_5$ | 32 to 40% |
| $Li_2O$ | 6 to 21% |
| $Na_2O$ | 8 to 31% |
| $K_2O$ | 4 to 22% |
| $Al_2O_3$ | 7.4 to 16% |
| ZnO | 0 to 19.6% |
| BaO | 0 to 12% and |
| Sum of $Li_2O + Na_2O + K_2O$ | 35.1 to 49%. |

2. An optical glass having a refractive index (nd) of 1.50 to 1.55, an Abbe number (vd) of 58 to 67, a press molding temperature no greater than 400° C. and a weight loss no greater than 0.15 weight %, which is represented, in term of elements for making up the glass, by the following chemical composition (mol %):

| | |
|---|---|
| $P_2O_5$ | 32 to 37% |
| $Li_2O$ | 6 to 19.5% |
| $Na_2O$ | 12 to 22% |
| $K_2O$ | 7 to 19% |
| $Al_2O_3$ | 8 to 15% |
| ZnO | 1 to 11% |
| BaO | 0.5 to 9% and |
| Sum of $Li_2O + Na_2O + K_2O$ | 36 to 47.5%. |

3. An optical glass for molding, as claimed in claim 1 or claim 2, wherein the following components are further added thereto (mol%):

| | |
|---|---|
| MgO | 0 to 2% |
| CaO | 0 to 6% |
| SrO | 0 to 2% |
| $In_2O_3$ | 0 to 2% |
| $ZrO_2$ | 0 to 4% |
| $WO_3$ | 0 to 2% |
| $Nb_2O_5$ | 0 to 2% |
| $TiO_2$ | 0 to 1.5% |
| $La_2O_3$ | 0 to 2% |
| $Y_2O_3$ | 0 to 2% and |
| $Gd_2O_3$ | 0 to 2%. |

4. The optical glass according to claim 1, consisting essentially of the recited ingredients.

5. The optical glass according to claim 4, consisting of the recited ingredients.

6. The optical glass according to claim 2, consisting essentially of the recited ingredients.

7. The optical glass according to claim 6, consisting of the recited ingredients.

* * * * *